United States Patent [19]

Pedersen

[11] 4,014,313

[45] Mar. 29, 1977

[54] APPARATUS AND METHOD FOR COLLECTING SOLAR ENERGY AT AN UPRIGHT SURFACE

[76] Inventor: David William Pedersen, P.O. Box 1241, Telluride, Colo. 81435

[22] Filed: June 9, 1975

[21] Appl. No.: 585,100

[52] U.S. Cl. .............................................. 126/270
[51] Int. Cl.² ........................................ F24J 3/02
[58] Field of Search ............ 237/1 A; 126/270, 271

[56] References Cited

UNITED STATES PATENTS

| 2,595,905 | 5/1952 | Telkes | 126/270 |
|---|---|---|---|
| 2,918,709 | 12/1959 | Corcoran | 126/270 X |
| 3,012,294 | 12/1961 | Waldor | 126/270 X |
| 3,048,375 | 8/1962 | Walker | 126/270 X |
| 3,239,144 | 3/1966 | Lueder | 126/271 |
| 3,369,540 | 2/1968 | Meekler | 126/271 |
| 3,863,621 | 2/1975 | Schoenfelder | 126/270 |
| 3,866,285 | 2/1975 | Clark | 126/271 |
| 3,957,029 | 5/1976 | Nozik et al. | 126/270 |

FOREIGN PATENTS OR APPLICATIONS

| 282,819 | 11/1971 | U.S.S.R. | 126/271 |

Primary Examiner—Kenneth W. Sprague
Attorney, Agent, or Firm—John R. Ley

[57] ABSTRACT

This apparatus and method for collection of solar energy is particularly adaptable for being formed as a part of or integrated into an upright or vertical surface of a building or structure. The apparatus involves a closed compartment, including an exterior transparent cover, within which are located energy receiving elements, each having an energy receiving surface oriented to efficiently receive solar energy. The apparatus may also include an interior transparent cover and reflective surfaces for further enhancing the characteristics of the collector, and the interior of the apparatus may be evacuated. The method may include the steps of providing a plurality of radiant energy receiving elements, each having an energy receiving surface at the exterior vertical surface of the building, and orienting the energy receiving surface at an angle for efficiently receiving radiant energy.

13 Claims, 4 Drawing Figures

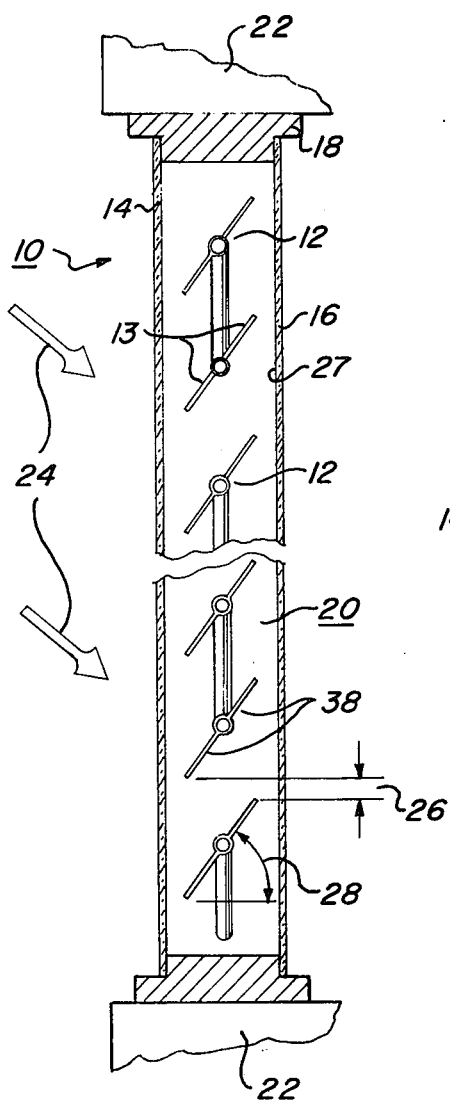
Fig_1
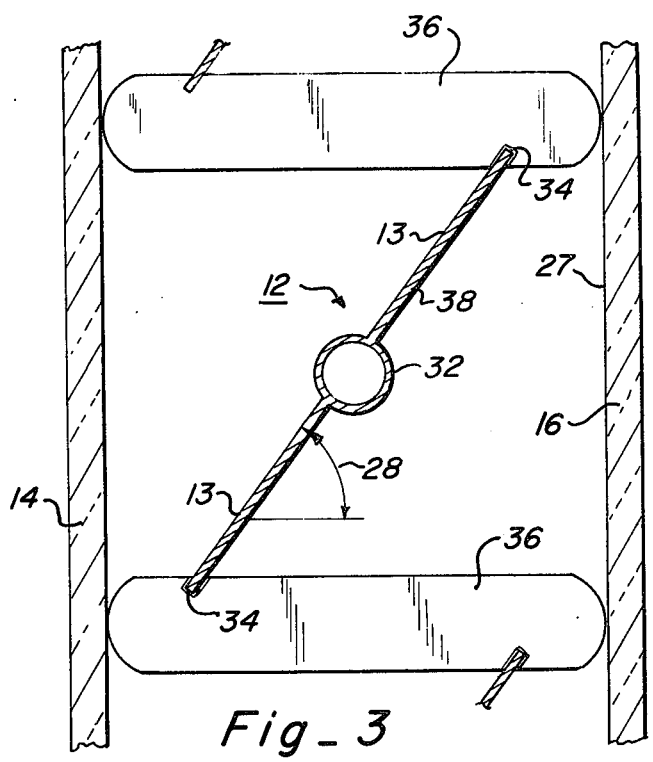
Fig_3
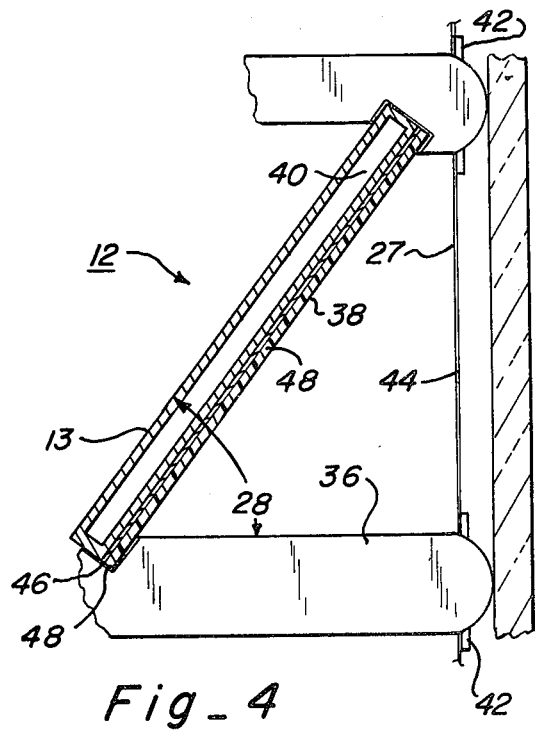
Fig_4

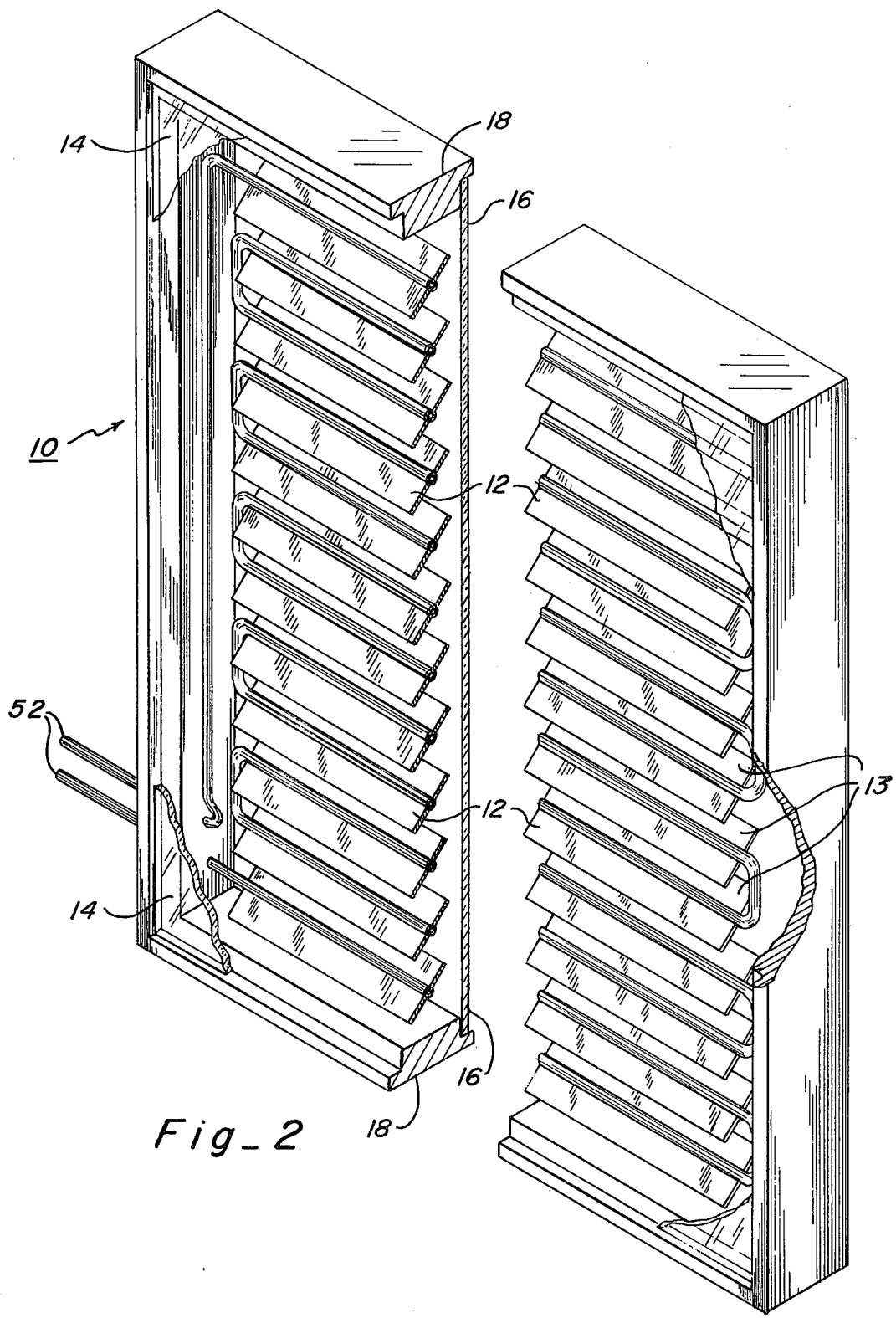
Fig_2

APPARATUS AND METHOD FOR COLLECTING SOLAR ENERGY AT AN UPRIGHT SURFACE

BACKGROUND AND SUMMARY OF THE INVENTION

This invention relates to solar energy, and more particularly to an apparatus and a method for collecting solar energy at a generally upright surface of a building, for example.

Prudent thought and modern day ecological and conservational trends are directing society to find sources of energy as alternatives to petrochemical and fossil fuels and nuclear energy. One such alternative source is solar energy, and it is well known that solar energy collectors may be employed to absorb radiant energy from the sun to allow utilization of that energy for various purposes, such as heating and cooling buildings, particularly dwelling houses.

Known prior art solar energy collectors present a number of substantial disadvantages in their use and application. Prior art solar collectors must generally be mounted on the roof of a building, and it is the usual practice to incorporate the solar collector as a part of the roof and hence to orient the roof and collector at an angle which results in the most efficient absorption of solar energy. This angle may generally be dependent upon the latitude of the locale where the solar energy collector is employed and may be 50° to 60° in the middle latitudes of the United States. The disadvantages of such installations include requirements that the design of the building must accommodate a particular slope of the roof, and the sloped roof must face a certain direction or exposure, usually south. Such requirements are not always aesthetically pleasing or architecturally proper for many building designs. The relatively high-pitched roof generally increases the cost of the building and may result in inefficient use of the interior space of the building since the attic space is large or the walls of the upper rooms slope radically. The single exposure of the collector and the roof necessarily result in inefficient energy absorption at certain times of the day, such as early morning and late evening, because the radiant energy does not directly impinge on the collector at these times due to the angle of the sun. Since the energy obtainable from a solar collector is generally related to its surface area, a roof-top solar collector may not be able to supply sufficient energy for use in large buildings, such as high-rise buildings, since such buildings have a relatively small roof area as compared to the interior volume in which the energy will be used. When solar energy collectors are adapted to conventional roofs, special mounting installations are usually required. These installations generally alter the shape of the building unless hidden by external design features, but these features require unnecessary and additional expense. A further disadvantage of known solar energy collectors is that they are prone toward breakage by natural elements such as snow and hail due to the upward exposure when mounted on the roof.

Accordingly, it is the general object of this invention to avoid the foregoing disadvantages of known prior art solar collectors while simultaneously achieving many advantages and desirable features heretofore unknown in solar energy collectors and in their use.

It is an object of this invention to provide an apparatus and method for collection of solar energy which may be integrated as a part of, or used in conjunction with, a vertical or upright surface of a building.

It is an object of this invention to provide an apparatus and method for collection of solar energy which may be effectively incorporated in a variety of conventional buildings and building designs.

It is another object of this invention to provide an apparatus and method for the collection of solar energy which does not alter the shape or aesthetic appeal of a building to which it is adapted.

It is another object of this invention to provide an apparatus and method for collection of solar energy at a generally upright surface of a building or structure which may be arranged for very efficient absorption of radiant energy under a variety of conditions.

It is still another object of this invention to provide an apparatus and method for collection of solar energy having transparent characteristics which may be used in a manner somewhat related to the use of a window in a building, but which does not greatly obstruct the view therethrough.

It is a further object of this invention to provide an apparatus and method for collection of solar energy having transparent characteristics which may be used in a manner somewhat related to the use of a window in a building and which greatly reduces any radiation of the energy absorbed into a building.

It is still a further object of this invention to provide an apparatus and method for collection of solar energy which, when used as a part of or integrated into a vertical or upright surface of a conventional building, may significantly reduce the effective costs associated with construction and operation of such a building.

To achieve these and other objects the present invention generally involves a method and apparatus for collecting solar energy at a generally upright or vertical surface of a building. The apparatus may include a compartment having an exterior transparent cover within which at least one energy receiving element is located. Each energy receiving element includes a flat or other energy receiving surface for absorbing radiant energy which may be oriented for efficiently receiving radiant energy from the sun. The compartment may further include an interior cover which may be transparent, and reflective surfaces may be provided to return radiant energy to the energy receiving elements that would not ordinarily be initially absorbed by the solar energy collecting apparatus and to prevent or reduce any radiation of the energy absorbed into the building. Generally, the energy receiving elements may be oriented to be parallel or horizontal with vertical spaces between adjacent energy receiving elements or vertical with horizontal spaces between the elements. Each of the energy receiving elements may include a means for transporting the energy absorbed which may include a conduit through which a fluid medium passes. The solar energy collecting apparatus may also be used in a manner somewhat related to a window in a building to allow vision through the spaces between the energy receiving elements. Alternatively, the interior cover may be insulative and non-transparent, allowing the solar energy collecting apparatus to be primarily employed as an aesthetic element of a generally upright surface of a building. A vacuum may be produced between the covers to enhance energy collection, absorption and transportation and to facilitate insulating the interior enviornment of the building from that of the exterior environment.

The method of the present invention may comprise the steps of providing at an exterior upright surface of a building a plurality of energy receiving elements each having an energy receiving surface, and orienting the energy receiving surface for efficiently receiving radiant energy from the sun. The method may also comprise the steps of encasing each energy receiving element in a transparent cover, evacuating the space inside the transparent cover, and providing a reflective surface behind the energy receiving elements.

The features of novelty which characterize this invention are recited with particularity in the annexed claims. The invention itself, however, as to its organization and method of operation and practice, together with further objects and advantages, will best be understood by reference to the following brief description of the drawings and detailed description of the invention.

BRIEF DESCRIPTION OF THE DRAWINGS

FIG. 1 is a side view of a section of one embodiment of the present invention;

FIG. 2 is a perspective view of one embodiment of the present invention which has been sectioned and partially broken away; and, FIGS. 3 and 4 are side views of particular elements used in different embodiments of the present invention.

In the drawings like elements are referenced by the same numerals.

DETAILED DESCRIPTION OF THE INVENTION

Referring now to FIGS. 1 and 2, there is shown an apparatus for collecting solar energy at a generally upright or vertical exterior surface which comprises a solar energy collector 10. The solar energy collector 10 includes at least one energy receiving element 12, although preferably a plurality of these elements are provided. Each element 12 is provided with an energy receiving surface 13 for receiving and absorbing radiant energy, which will be described more fully subsequently. Each energy receiving element 12 is located within a compartment 20, which may be formed by an exterior transparent cover member 14 and an interior cover member 16 retained preferably in a spaced apart and parallel relationship by a frame member 18. In some embodiments, the compartment is generally closed or may be sealed by an airtight seal between the cover members 14 and 16 and the frame member 18. The frame member 18 is one means by which the solar energy collector may be retained at a generally upright or vertical surface of, for example, a building 22. When so retained, the exterior cover member 14 faces outward toward the external environment of the building while the interior cover 16 faces toward the inside of the building.

The exterior cover member 14 is made of transparent material such as tempered glass or clear plastic. The transparent material allows the entry of radiant energy from the sun indicated schematically at 24. The interior cover member 16 may in some embodiments also be made of transparent material and thus provides that the solar energy collector may be advantageously used in a manner somewhat related to the use of a window in a building.

The energy receiving elements 12 may be provided in a generally vertical column with a vertical space 26 between adjacent energy receiving elements 12. In the arrangement in which the interior cover member 16 is transparent, the vertical space 26 allows a sight path between the energy receiving elements 12 through the solar energy collector 10 from the interior of the building 22. The dimension of the vertical space determines the degree of elevation of the sight path above the horizontal and variation of the space 26 along the column or throughout the collector 10 may be desirable depending on the circumstances and requirements of a particular application. The energy receiving elements may also be arranged vertically with horizontal spaces between the elements. In this arrangement the sight path between the elements 12 is not limited as to the degree of elevation relative the horizontal. In none of the embodiments is the sight path below the horizontal greatly impeded as is more apparent from the subsequent description. It may prove feasible to cause the elements to be movable to allow the elements 12 to occupy various positions within the compartment 20, such as for example, by tilting a whole array of movable elements.

The outward facing surface of the interior cover member 16 may be provided with a reflective surface 27, which when member 16 is transparent, may be a transparent mirrored surface or a reflective plastic film. The reflective surface 27 need not prevent sight outward from the interior of building 22, but prevents or impedes the transmittal of radiant energy 24 to the interior of the building 22. The reflective surface 27 may cause radiant energy not initially impinging on the energy receiving elements 12 to be reflected back onto those elements. The reflective surface is also important in reducing reradiation or radiation of the energy absorbed by the elements 12 through the transparent cover member 16 into the interior of the building. This is a significant feature of the invention since reradiation might otherwise amount to a considerable and undersirable influx of heat energy into the building. Other features of the present invention also aid in preventing reradiation as will be described subsequently.

When a plurality of energy receiving elements 12 are provided within the compartment 20, and the present invention is employed in collecting solar energy at a generally upright surface, it is usually advantageous that the energy receiving elements 12 be oriented generally in parallel relation with one another. Oriented in a parallel relation, all of the elements 12 can provide a greater collective absorption area or surface for receiving the radiant energy from the sun.

The energy absorbing surface 13 of each of the elements 12 may usually comprise a flat surface as shown more clearly in FIG. 3, for example. Other geometric configurations may be advantageous also. The energy absorbing surface 13 faces outwardly of the solar energy collector 10 and generally provides a means by which the radiant energy 24 is received and absorbed. The energy receiving surface 13 may be of a color and texture particularly adapted for absorbing radiant energy. Generally the energy absorbing surface will be of a dull nature and dark, and its texture may be somewhat coarse, but such may also be determined empirically for particular applications.

The energy receiving element 12 will typically be constructed of a good heat conductive material such as metal. In the embodiment shown in FIG. 3, the energy receiving element 12 comprises a conduit or tube 32 to which are attached, for example by welding or soldering, two wings 34. The wings 34 are made of heat conductive material and readily absorb radiant energy that impinges upon them. The energy absorbed causes heat which is readily conducted to the tube 32 by the heat conductive properties of the wings 34. The tube 32 provides a means through which a fluid medium may be passed to transfer the energy absorbed by the energy receiving surface 13 of the wings 34 away from the elements 12 and the collector 10.

Each of the energy receiving elements 12 and the energy receiving surfaces 13 is oriented at an angle 28 for efficiently receiving radiant energy. In the embodiment where a vertical space separates the elements 12, the angle 28 is measured from the horizontal plane and may be best determined for a particular locale and application in which the solar energy collector 10 is to be employed. In the embodiment with vertical energy receiving elements 12, the angle 28 is measured from a north-south longitudinal line. Generally speaking, the angle 28 is that angle which normally would result in the greatest absorption of the radiant energy of the sun, depending on the particular latitude where the solar energy collector 10 is employed, the direction or exposure that the collector 10 faces, the particular climate, and the relative intensity of the sun during particular seasons of the year in a particular locale and other factors depending upon a particular application of the present system. For example, an angle 28 of 50° to 60° for horizontal energy receiving elements having a southern exposure and a latitude approximately midway in the United States may prove satisfactory. Orienting the elements 10 and the flat energy receiving surfaces 13 at the angle 28 presents a surface perpendicular to the angle of impingement of the radiant energy 24 under overall circumstances conducive to high energy absorption. Other geometric configurations for the energy receiving elements would be oriented according to the particular configuration.

It is noted that the angle 28 of orientation for the energy receiving surface causes the energy receiving elements 12 to be somewhat parallel to a downward sight path through the collector. Thus the downward line of sight is not greatly impeded.

Shown in FIGS. 3 and 4 are support members 36 extending between the exterior cover member 14 and the interior cover member 16. The support member 36 may serve to brace the interior and exterior cover members to secure them against breakage, and may also support and orient the energy receiving elements 12 at desired positions to provide the energy receiving surface 13 at the angle 28 for efficiently absorbing radiant energy. The support members 36 should also be of material resistant to the conduction of heat energy and should be of the smallest cross sectional area possible consonant with the requirements for strength to thereby reduce heat transfer between the cover members and to avoid obstructing the sight path between the elements. The rounded ends in contact with the cover members provide a small cross-sectional contact area to further reduce heat transfer. Other means to support the elements may be employed if the elements are movable.

The support members 36 in FIG. 4 also include tabs 42 upon which a reflective plastic film 44 may be stretched and supported in a spaced manner from the interior cover member 16. The reflective film 44 serves to provide the reflective surface 27 to reduce reradiation of energy from the energy receiving elements 12. By spacing the film 44 from the cover member 16, that energy absorbed by the film during reflection of the radiation is not efficiently conducted to the interior cover member 16. This, of course, further reduces the energy transmitted to the interior of the building from the collector 10. Other means for supporting the reflective film in a spaced relation from the cover member may also be desirable.

In another embodiment of the present invention, the compartment 20 may be sealed and evacuated. This has particular advantages in providing insulation against connection and conduction of heat between the exterior and interior environments of the building. When a vacuum or partial vacuum is provided the support members 36 serve to prevent the cover members from collapsing inward. The vacuum also aids in isolating the energy absorbed by the elements 12 so as to enhance absorption, collection and transportation of greater amounts of the energy from the collector 10. Furthermore the evacuated compartment when used in a manner somewhat related to the use of a window serves as effective insulation for the building.

Another arrangement of an energy receiving element 12 which may be used in the embodiments of the present invention is shown in cross-section in FIG. 4. This particular arrangement involves a flat conduit 40 which may be of heat conductive metal. The flat conduit 40 includes the energy receiving surface 13 which may be flat or of other geometric configuration. The open interior of the flat conduit 40 provides a means by which a fluid medium may be passed to transfer the heat energy created by the radiant energy absorbed by energy receiving elements 12 away from the collector 10.

The present invention may also provide a second inward facing surface 38 of the energy receiving elements 12 particularly adapted to reduce reradiation from the elements 12 and to facilitate return of light toward the inside of the building. In the embodiment shown in FIG. 3, the second surface is smooth and colored white or is silvered or mirrored to reflect reradiation back into the element 12. The surface 38 also reflects light passing from inside of the building back to the inside. In the embodiment in FIG. 4, a reflective metal foil 46 may be spaced from the inward facing side of the element 12. Other reflective materials may be used as alternatives to the metal foil. The foil 46 or other substance reduces reradiation by reflection of the radiant energy back into the element 12. A layer of insulation 48, such as plastic, may be provided over the foil or other substance to further confine the energy to element 12. The inward facing surface of the insulation 48 may be colored and textured as previously described.

As can best be seen in FIG. 2, the fluid medium conduits of each of the energy receiving elements 12 are connected. These fluid medium conduits thus connect the elements 12, for example, in series as shown in FIG. 2, so that the heat energy created by the absorption of radiant energy by the energy receiving elements 12 may be transported from the solar energy collector 10 by fluid inlet and outlet means 52. Although the energy receiving elements 12 are shown connected in a series in FIG. 2, it may be advantageous in some applications that these elements be connected in parallel. The connections of the conduits must be flexible when the energy receiving elements are movable. The inlet and outlet means 52 may also be sealed in an airtight manner against frame 18 to secure the vacuum with the compartment 20 when employed.

The operation of the solar energy collector 10 of the invention will now be discussed. Radiant energy 24 originating with the sun passes through the exterior transparent cover member 14 and impinges on the energy receiving elements 12. The energy receiving surface 13 of each of the elements 12 absorbs the radiant energy 24 as heat energy. Any radiant energy 24 that may initially escape being absorbed will generally pass between the elements 12 to the interior cover member 16 where it may pass through the cover member 16 if transparent to the interior of the building, or it may encounter the reflective surface adjacent the interior cover member which returns it back onto the elements 12. The second inward facing surface 38 of the energy receiving elements 12 facilitates the return of light back toward the inside of the building. The reflective surfaces inward from the energy receiving elements and adjacent the interior cover member significantly reduce reradiation of energy into the building. The angle 28 in which each of the energy receiving surfaces 13 of the energy receiving elements 12 is oriented is that angle for efficient reception and absorption of radiant energy from the sun. As the radiant energy is absorbed to cause heat in the heat conductive energy receiving elements 12, a fluid medium circulating through the elements 12 transports this heat energy from the solar energy collector 10. The heated fluid medium may then be employed in the well known manner such as for heating or cooling the interior of the building 22.

The present invention also includes a method by which radiant energy may be collected at the external surface of a building. This method includes the steps of providing a plurality of radiant energy receiving elements, for example 12, at a vertical or upright external surface of the building, for example at 22, with each radiant energy receiving element having an energy receiving surface, for example 13. Each energy receiving surface is then oriented at an angle, for example 28, to effectively receive radiant energy from the sun. Furthermore, this method may also include the steps of encasing the energy receiving elements in a transparent cover, for example 14, and evacuating the space encased by the transparent cover. The steps of providing a reflective surface and a second transparent cover, for example 14, behind the radiant energy receiving elements may also be included.

From the foregoing description of the apparatus and method for collecting solar energy, a number of significant advantages of the present invention are apparent. The invention does not require that the solar energy collector be mounted on the roof of the building, and does not interfere with the building design or the space available for use in the interior of the building. Mounted at a generally upright or vertical surface, the solar collector is shielded from natural elements such as hail and snow. A highly significant advantage of the present invention is that it makes solar energy collection for large or high rise buildings feasible. The large vertical surface involved in such large or high rise buildings, for example, extending as much as 100 stories above the ground, provides a very large energy collecting area which is necessary if solar energy is to be used in a practically effective manner in such large buildings.

In high rise buildings which are usually built primarily from glass and steel, the embodiment in which the cover members are transparent may be used in a manner somewhat similar to windows without greatly increasing the building construction costs or requiring redesign of these buildings. Reradiation of the energy absorbed by the energy receiving elements is significantly reduced and does not thus present an impediment to the employment of the invention in a manner somewhat similar to a window. The present invention may eliminate the necessity for and cost of venetian blinds, drapes and various sun screens very often employed in such high rise buildings to shield the interior from the sun because the invention absorbs and impedes entry of the radiant energy.

The arrangement of the energy receiving elements in the apparatus allows a relatively unimpeded view through the solar energy collector downward to a desired degree above the horizon. Another significant advantage is that very efficient building insulation may be achieved by the embodiment of the present invention in which the interior of the solar energy collector is evacuated. The vacuum, the various reflective surfaces and other described characteristics of the invention insure that the interior and the exterior environments of the building and the energy absorbed are effectively isolated, thereby effectively absorbing energy for conditioning the interior environment and simultaneously maintaining that environment. The vacuum in the solar energy collector may make it unnecessary to remove a water medium from the energy receiving elements when the exterior temperature drops below freezing since the vacuum inhibits heat transfer to the water medium to prevent it from freezing.

Another significant feature is that solar energy may be collected on more than one exposure of a building by the present invention and under a variety of conditions. Typically the previous methods and apparatus were adapted only to southern exposures, but with the present invention, by orientation of the energy receiving elements, effective collection of the morning and evening sun at the eastern and western exposures, respectively, may be achieved. Under some circumstances energy collection at all exposures of a building may be feasible. The arrangement of the reflective surfaces and the energy receiving elements allow the apparatus and method to be aesthetically employed to design distinctive exterior appearances in buildings. Lastly, the present invention may be used in conjunction with other types of solar collectors to augment the effectiveness of solar energy collection while still providing the foregoing advantages.

The invention has been shown and described with particularity, and it is probable that those skilled in the art will forsee changes and modifications without departing from the scope of the invention. Therefore, it is intended by the appended claims to cover all such changes and modifications as fall within the true spirit and scope of the invention.

What is claimed is:

1. A solar energy collector adaptable for use at an exterior generally upright surface of a building comprising:
   a compartment having spaced apart exterior and interior covers of essentially transparent characteristics, and means for retaining the compartment at an exterior generally upright surface of a building;
   at least one energy receiving element comprising at least one solar radiant energy receiving and absorbing surface generally oriented at an angle to the plane of the generally upright building surface for efficiently receiving solar radiant energy according to the position of retention of said compartment at the exterior surface of the building, each energy receiving element also comprising a conduit means connected in heat conductive relationship with each solar energy receiving and absorbing surface, each energy receiving element being retained within said compartment between the interior and exterior cover members with a space on each side of each energy receiving element, the space on each side of each energy receiving element in conjunction with the angular orientation of the solar radiant energy receiving and absorbing surface providing a substantial sight path directly and angularly through said compartment; and means connecting the conduit means for passing a fluid medium through the conduit means and for transporting energy away from each energy receiving element and out of said compartment.

2. A solar energy collector as recited in claim 1 wherein each solar radiant energy receiving and absorbing surface is flat.

3. A solar energy collector as recited in claim 1 further including means for impeding reradiation loss of the energy absorbed by each energy receiving element and emitted toward the interior of the building.

4. A solar energy collector as recited in claim 3 wherein the interior cover includes a reflective surface thereon.

5. A solar energy collector as recited in claim 3 wherein a reflective surface is spaced from said interior cover member.

6. A solar energy collector as recited in claim 3 wherein each energy receiving element includes a second inwardly facing surface other than the energy receiving surface and reflective material is provided adjacent the second surface.

7. A solar energy collector as recited in claim 6 wherein insulation is provided adjacent the reflective material and between the reflective material and the interior cover.

8. A solar energy collector as recited in claim 7 wherein the surface of the insulation facing the interior cover is adapted to return light toward the interior of the building.

9. A solar energy collector as recited in claim 3 wherein a plurality of energy receiving elements are provided within said compartment and at least some of the energy receiving elements are parallel to one another.

10. A solar energy collector as recited in claim 9 wherein the energy receiving elements are generally horizontal.

11. A method for collecting solar radiant energy at an exterior generally upright surface of a building, comprising the steps of:

providing a plurality of solar radiant energy receiving elements at a transparent exterior generally upright surface of a building, each element having an energy receiving surface and a conduit in heat conductive relationship with the energy receiving surface;

orienting each energy receiving surface generally at an angle to the exterior generally upright surface of the building for effectively receiving radiant energy;

separating each solar radiant energy receiving element by a space on each side of each energy receiving element to allow a sight path directly and angularly through the transparent exterior surface of the building between adjacent energy receiving elements;

passing a fluid medium through each conduit in each energy receiving element; and transporting energy from each energy receiving element and to a remote area of the building for use.

12. A method as recited in claim 11 further including the step of:

returning inwardly directed radiant energy emitted from said energy receiving elements back toward said energy receiving elements to impede reradiation into the interior of the building.

13. A method as recited in claim 12 further including the step of providing a reflective surface behind the energy receiving elements.

* * * * *